United States Patent [19]

Marttila

[11] Patent Number: 4,942,958
[45] Date of Patent: Jul. 24, 1990

[54] BELT-DRIVE CONVEYOR SYSTEM FOR REFUSE

[76] Inventor: Erik A. Marttila, 9785 Flying Mane La., Alta Loma, Calif. 91701

[21] Appl. No.: 307,762

[22] Filed: Feb. 7, 1989

[51] Int. Cl.⁵ .......................... B65G 23/14; B60P 1/38
[52] U.S. Cl. ..................................... 198/833; 210/401; 414/528
[58] Field of Search ............... 198/606, 608, 790, 833, 198/835, 854; 210/401; 414/528

[56] References Cited

U.S. PATENT DOCUMENTS

| | | | |
|---|---|---|---|
| 1,626,041 | 4/1927 | Kyle et al. | 198/833 X |
| 3,937,338 | 2/1976 | Cox | 414/528 |
| 4,178,251 | 12/1979 | Iwatani | 210/401 X |

Primary Examiner—Duane A. Reger
Attorney, Agent, or Firm—Lyon & Lyon

[57] ABSTRACT

A watertight belt-drive conveyor system for transporting semi-liquid sludge from semitrailers is disclosed. The conveyor belt is looped around two pulleys located at either end of the trailer and transported by a main drive drum located below the trailer. Adequate frictional pressure is maintained between drum and conveyor belt for driving the conveyor belt under load by a system of four pulleys which force a full-width V-belt into close frictional contact with the outer surface of that portion of the conveyor belt which is wrapped around the main drive drum.

5 Claims, 1 Drawing Sheet

BELT-DRIVE CONVEYOR SYSTEM FOR REFUSE

BACKGROUND OF THE INVENTION

The field of the present invention is conveyor systems for refuse and semi-liquid sludge removal.

Refuse and semi-liquid sludge removal, especially from semitrailers, has usually been accomplished with a chain-and-sprocket system. A large-pitched roller chain travels along each side of the floor of the trailer and is operated by a sprocket and motor in the rear. Transversely-oriented slats are connected between the chains at periodically-spaced points, usually with a rubber or rubber-like sheet material attached between each slat, such that the combination of chains, slats, and sheets transport the refuse and/or sludge to the rear of and out of the trailer.

A major disadvantage to the above system is that leakage occurs around the edges of the sheets along the sides of the trailer, and in the cracks between each sheet. The sheets cannot be made unbroken or continuous because, as they revolve about the outer periphery of the chain in its travel around the sprockets, the sheets travel a longer distance around the sprockets than does the underlying chain to which they are attached. Because of environmental and toxicological concerns, a leaking refuse container is highly undesirable. In addition, a chain and sprocket assembly is relatively heavy and absorbs power. Therefore, there exists a need in the art for a more efficient and watertight refuse and semi-liquid sludge conveyor system, especially in semitrailer applications.

SUMMARY

The present invention is directed to a conveyor belt system which utilizes a secondary belt-drive to increase traction between the main drive drum and the conveyor belt, with a resulting increase in the transference of torque from drive drum to conveyor belt, such that the chain, sprocket, and slats of the prior art device are completely eliminated. Therefore, this invention provides a more watertight refuse conveyor system.

In one aspect of the present invention, a conveyor belt in a semitrailer is driven by a main drive drum located under the floor of the trailer while looping around other non-driven idler pulleys located at either end of the floor of the trailer. The main drive drum and one or two additional driven pulleys located above the drum but below the trailer, along with two additional non-driven idler pulleys located below the drum, all drive a multi-V drive belt in close frictional contact with the conveyor belt around the part of the conveyor belt which is partially wrapped around the main drive drum. The use of a V-belt to increase the traction between the main drive drum and the unbroken conveyor belt produces the necessary driving force to transport the heavy refuse into or out of the trailer, while providing a watertight seal between the floor of the trailer and the area above the conveyor belt, which could not be obtained with conventional chain-and-sprocket drives.

Accordingly, it is an object of the present invention to provide a conveyor-belt system which eliminates the chain, sprocket, and slat combination found in prior art devices by using secondary belt-drive for refuse and semi-liquid sludge removal such that the resultant system is watertight.

It is a further object of the present invention to provide a conveyor-belt system with secondary belt-drive for refuse and semi-liquid sludge removal which provides about the same amount of driving force for driving the conveyor belt as the chain and sprocket system of the prior art.

It is a further object of the present invention to provide a conveyor-belt system with secondary belt-drive for refuse and semi-liquid sludge removal which is lighter and consumes less power than a chain-and-sprocket conveyor system and is therefore more energy efficient.

DETAILED DESCRIPTION OF THE PREFERRED EMBODIMENT

Figure 1:
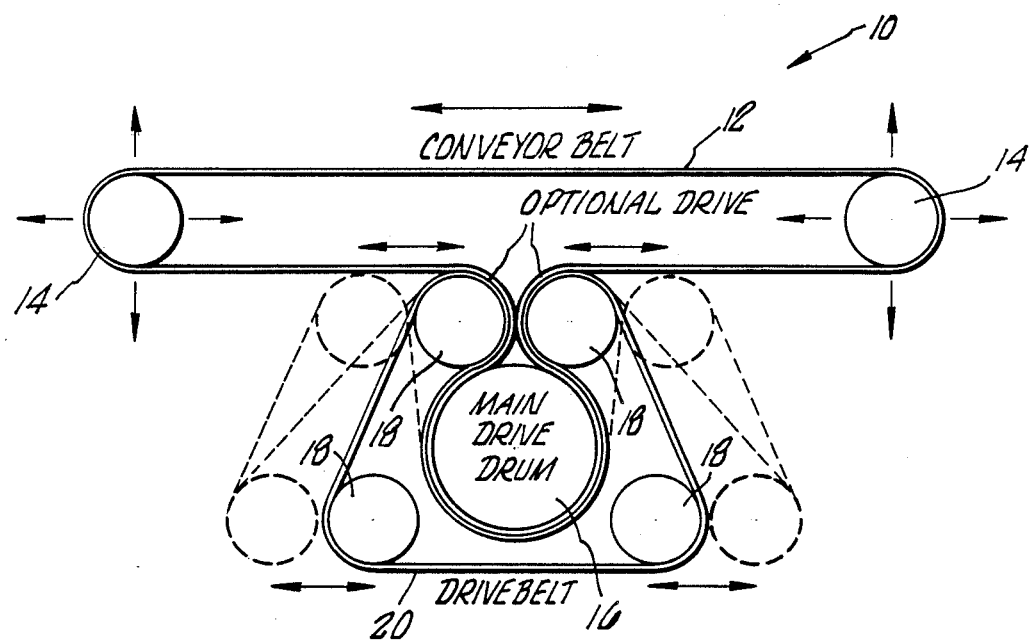
Fig. 1 is a side elevation view of the conveyor-belt system of the present invention, with pulleys 18 shown in alternative positions in phantom.
Figure 2:
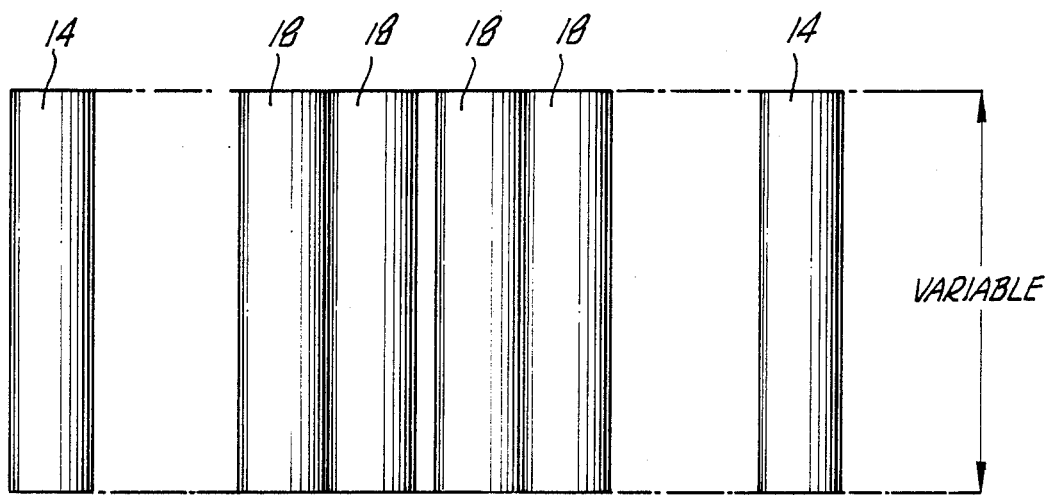
FIG. 2 is a top plan view of the conveyor system of FIG. 1, with the conveyor belt drawn in phantom.

Referring to FIG. 1, a conveyor system 10 is shown for transporting refuse composed generally of semi-liquid sludge out of or into a semitrailer. A conveyor belt 12 which is as wide as the inside of the trailer itself is partially wrapped around two pulleys 14, which are positioned far apart at separate ends of the trailer. Below the floor of the trailer is a main drive drum 16, about which the conveyor belt 12 is partially wrapped. The main drive drum 16 is rotated by any conventional power source (not shown) in order to frictionally move the conveyor belt 12 around the circuit formed by pulleys 14 and main drive drum 16, thereby transporting refuse into or out of the trailer at either end.

In order to increase the traction between conveyor belt 12 and main drive drum 16 to the level necessary to transport the heavy loads to be encountered in loading and unloading refuse, a system of four pulleys 18 holds a drive belt 20 in close frictional contact with that portion of conveyor belt 12 which is partially wrapped around the main drive drum 16. Two of the pulleys 18 are located below and to either side of the main drive drum 16. Two other pulleys 18 are located above and to either side of the main drive drum 16. Drive belt 20 is wrapped partially around all four pulleys 18, and is also wrapped around the portion of conveyor belt 12 which is partially wrapped around main drive drum 16. The axes of two upper pulleys 18 are horizontally adjustable, in order to bring upper pulleys 18 close enough together in order to both increase the frictional contact pressure and frictional contact area between conveyor belt 12, drive belt 20, and main drive drum 16 to a level which provides the necessary driving force to the conveyor belt 12 to transport refuse into or out of the trailer.

In order to increase the driving force of the conveyor belt 12, one or both of the upper pulleys 18 may be driven by any conventional external power source (not shown). The drive belt 20 may comprise either a full-width single multi-V belt or a set of many individual V-belts operated in parallel for the entire width of the pulleys 18. The axes of all six pulleys 14, 18 are adjustable in the horizontal direction in order to adjust the tensions of the conveyor belt 12 and drive belt 20, respectively. The axes of the two upper pulleys 14 which contain the conveyor belt 12 are, in addition, adjustable in the vertical direction, with the ends of each pulley 14 being independently adjustable in both the vertical and horizontal directions to allow for correcting variations in the length of conveyor belt 12 along its width so as to provide accurate tracking.

The unbroken, full-width conveyor belt of the present invention allows semi-liquid sludge to be transported into or out of a semitrailer with virtually no leakage along the edges, while the disclosed drum and pulley secondary belt-drive arrangement ensures sufficient driving force to allow the conveyor belt to transport the heavy loads demanded of it. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A conveyor belt drive system located in the floor of a container used for transporting refuse and semi-liquid sludge comprising
   a main drive drum driven by an external power source;
   at least six pulleys whose width is the same as said main drive drum;
   a conveyor belt whose width is the same as said main drive drum, said belt being partially wrapped around at least two of said pulleys positioned horizontally apart, said belt also being partially wrapped around said main drive drum which is positioned between and below said pulleys about which said conveyor belt is partially wrapped;
   a drive belt means whose width is the same as said main drive drum, said drive belt means being partially wrapped around said main drive drum outside of but in close frictional contact with said conveyor belt, said drive belt also being partially wrapped around the remaining said pulleys, at least two of which are located below and to either side of said main drive drum and at least two of which are located above and to either side of said main drive drum, said upper pulleys forcing said drive belt means into close frictional contact with and thereby increasing both frictional contact pressure and frictional contact area with said conveyor belt as both said drive belt means and said conveyor belt are partially wrapped around said main drive drum.

2. The invention of claim 1, in which at least one of said pulleys forcing said drive belt means into close frictional contact with said conveyor belt is driven by any conventional external power source.

3. The invention of claim 1 in which said drive belt means comprises a single multi-V belt.

4. The invention of claim 1 in which said drive belt means comprises more than one V-belt operating in parallel.

5. The invention of claim 1 in which the axes of all said pulleys are adjustable in the horizontal direction, the axes of said two uppermost pulleys about which said conveyor belt is partially wrapped also being adjustable in the vertical direction, with the ends of each of said two upper pulleys being independently adjustable.

* * * * *